United States Patent [19]

Reinl et al.

[11] Patent Number: 4,857,356
[45] Date of Patent: Aug. 15, 1989

[54] DIETETIC STARCH-CONTAINING PREPARATION

[75] Inventors: Hubert Reinl, Tuessling, Schmidt; Elke; Elke Schmidt, Waldkraiburg, both of Fed. Rep. of Germany

[73] Assignee: Nestec S.A., Vevey, Switzerland

[21] Appl. No.: 88,877

[22] Filed: Aug. 24, 1987

[30] Foreign Application Priority Data

Sep. 5, 1986 [EP] European Pat. Off. ......... 86112298.4

[51] Int. Cl.$^4$ .......................... A23L 1/164; A23L 1/10
[52] U.S. Cl. ....................................... 426/620; 426/28; 426/484; 426/618
[58] Field of Search ................ 426/618, 619, 620, 621, 426/484, 463, 28

[56] References Cited

U.S. PATENT DOCUMENTS

| | | | |
|---|---|---|---|
| 2,853,388 | 9/1958 | Kiely et al. | 426/619 |
| 3,262,783 | 7/1966 | Blanchon | 426/618 |
| 3,506,447 | 4/1970 | Billerbeck et al. | 426/619 |
| 3,640,729 | 2/1972 | Ronai et al. | 426/620 |
| 3,887,714 | 6/1975 | Kelly et al. | 426/619 |
| 3,956,506 | 5/1976 | Cloud et al. | 426/621 |
| 4,374,860 | 2/1983 | Gasser et al. | 426/463 |
| 4,431,674 | 2/1984 | Fulger et al. | 426/619 |
| 4,438,150 | 3/1984 | Gantwerker et al. | 426/619 |

OTHER PUBLICATIONS

Reed, 1929, "A New Fruit Cereal", The Fruit Products Journal, 31 Union Square, N.Y. N.Y.

*Primary Examiner*—Donald E. Czaja
*Assistant Examiner*—Helen Pratt
*Attorney, Agent, or Firm*—Vogt & O'Donnell

[57] ABSTRACT

Cereal is combined with more than 50% fruit or vegetable foods by weight for obtaining a nutritional fluid food composition. The cereal component is based upon an enzymatically hydrolyzed cereal in liquid form. The composition does not require including sugar as a further component of the composition and is comprised of at least 10% cereal by weight based on dry matter and in addition to the fruits or vegetables and enzymatically hydrolyzed cereal in liquid form, includes oatmeal, water and oil for providing a desired fat content.

16 Claims, No Drawings

DIETETIC STARCH-CONTAINING PREPARATION

BACKGROUND OF THE INVENTION

This invention relates to a dietetic starch-containing preparation and to the use of enzymatically hydrolyzed cereals for the production of this preparation.

The object of the invention is to provide a preparation of high cereal content for infants. Normal cereal preparations with fruit cannot contain any more than 4% cereals because otherwise they are too solid in their consistency. There is a need to provide preparations of higher cereal content for infants, because the higher the cereal content, the longer the feeling of fullness lasts. The present invention provides such a preparation which contains clearly noticeable cereal components or husk constituents and which is creamy and may be eaten by the spoonful.

SUMMARY OF THE INVENTION

The present invention provides to a dietetic starch-containing preparation which contains more than 50% fruit or vegetables, at least 10% cereals, 22 to 24% carbohydrates, between 2 and 4% fats, between 1 and 3% protein and water. The present invention also provides a use for enzymatically hydrolyzed cereals in liquid form and a process for preparing the preparations of high cereal content.

In terms of nutrition physiology, a whole grain content of 10–13% based on dry matter and a fats content of 2 to 4% may be regarded as balanced. The preparation contains no added binder or sugar.

The fruit or vegetable component is intended to predominate in terms of flavour with the taste of the cereal component remaining in the background. Accordingly, an upper limit to the cereal content of 13% is reasonable.

The need for such a cereal content based on dry matter and the stipulation "no added sugar" can only be fulfilled by the use of enzymatically prepared cereals. These enzymatically hydrolyzed cereals (HC) are produced by the process according to EP Pat. No. 31 050. The cereal component consists of 2.5 to 3.5% oatmeal and 20 to 25% enzymatically hydrolyzed cereals in liquid form. The oatmeal is used to bind the preparation.

DETAILED DESCRIPTION OF THE INVENTION

The preparation of this invention is particularly suitable for infants over 6 months. In the context of the invention, cereals are understood to be a starch-containing material, such as a flour or a cereal starch or a starch of a mixture of cereals, more especially wheat, barley, oats, rye, rice and/or corn. Fruits are understood to be pineapples, apples, oranges, bananas, cherries, etc., while vegetables include peas, spinach, carrots, celery, tomatoes, etc.

The invention also relates to the use of enzymatically hydrolyzed cereals and provides a process for the production of the above-mentioned preparation by mixing together 20 to 25% ECH in liquid form having a dry matter content of 35 to 40%, more than 50% fruits or vegetables, between 2.5 and 3.5% oatmeal and water at an acidic pH value.

For the fruits, mixing is carried out at a pH of approximately 4 and, for the vegetables, at a pH of from 5 to 6.

In principle, the preparation of the EHC comprises mixing flour with water and adding α-amylase and amyloglucosidase under the conditions described in the abovecited Pat. No. EP 31 050. A flour-water mixture having a dextrose equivalent (DE) of from 50 to 55 is obtained to this way. The enzyme reaction liquefies (α-amylase) and saccharifies (amyloglucosidase) the flour paste.

An EHC content of more than 25% is reflected sensorially in predomination of the cereal component. The EHC does not contribute towards binding and, in this regard, does not have an upper quantitative limit. For the product group in question, EHC is used in liquid form with a dry matter content of approximately 38%. Basically, EHC may be prepared with a lower DE value (DE approx. 35) and dried by spray or roller drying. In this case, a higher EHC content is necessary to achieve the desired sugar content.

The general procedure is as follows: the fruits or vegetables are passed through a sieving machine. The other ingredients (EHC, flour (oatmeal), water, oil) are added to the sieved fruits or vegetables in a mixer and the mixture then is heated, degassed, reheated, packed such as in glass jars and pasteurized. The mixture is heated to around 90° C. on a plate-type heat exchanger, followed by degassing and reheating at around 98° C. The product is then ready for packing, which is done at around 90° C., and finally is pasteurized.

EXAMPLES

The invention is illustrated by the following Examples in which the percentages indicated are by weight.

EXAMPLE 1

Preparation of the EHC 41.209 kg oatmeal are mixed with 62 kg water, 1.236 kg amyloglucosidase (3%) and 0.054 kg amylase B 100 (0.13%) and further processed under the same conditions as in Example 1 of EP Pat. No. 31 050 except that, instead of drying, the preparation is used in liquid form with a DE value of 50–55 and a dry matter contents of approx. 38%.

EXAMPLE 2

Tables 1 to 4 below provide examples of fruit preparations:

TABLE 1

| | |
|---|---|
| Apples | 40% |
| Sour cherries, stoned | 15% |
| Oil | 2% |
| EHC oats, DE = 50–55 | 21% |
| Oatmeal | 3.5% |
| Water | 10.4% |
| Other ingredients (juice concentrate) | 8.1% |

TABLE 2

| | |
|---|---|
| Grated pineapple | 21% |
| Apples | 40% |
| Cream | 6.7% |
| EHC oats, DE = 50 | 21% |
| Oatmeal | 3% |
| Water | 2% |
| Other ingredients (juice concentrate) | 6.3% |

TABLE 3

| | |
|---|---|
| Apples | 45% |
| Oranges | 6% |
| Cream | 3.3% |
| Oil | 1% |
| EHC oats, DE = 50–55 | 21% |
| Oatmeal | 2.5% |
| Water | 6.5% |
| Other ingredients (juice concentrate) | 14.7% |

TABLE 4

| | |
|---|---|
| Apples | 40% |
| Bananas | 20% |
| Oil | 2% |
| EHC oats, DE = 50–55 | 20% |
| Oatmeal | 3% |
| Water | 10.5% |
| Other additives (juice concentrate) | 4.5% |

EXAMPLE 3

The following Table shows the nutrition values of the four preparations indicated above:

TABLE 5

| | Fat % | Protein % | Carbohydrate % | KJoules per 100 G |
|---|---|---|---|---|
| Sour cherries and apples | 3.1 | 2.0 | 22.6 | 536 |
| Pineapples and apples | 3.0 | 1.9 | 23.9 | 552 |
| Oranges and apples | 2.9 | 1.9 | 23.4 | 540 |
| Bananas and apples | 3.0 | 2.0 | 22.7 | 533 |

We claim:

1. A fluid food product comprising by weight a mixture of more than 50% of food selected from the group consisting of fruits and vegetables, at least 10% cereal which, based on dry matter, comprises from 2.5% to 3.5% oatmeal and from 20% to 25% enzymatically hydrolyzed cereal in liquid form, and water and oil for providing a fat content of from 2% to 4%.

2. A food product according to claim 1 wherein the enzymatically hydrolyzed cereal has a dry matter content of from 35% to 40% by weight.

3. A food product according to claim 1 or 2 wherein the food product contains from 10% to 13% of cereal by weight based upon dry matter.

4. A food product according to claim 1 further comprising a juice concentrate.

5. A food product according to claim 1 or 2 wherein the enzymatically hydrolyzed cereal has a DE value of at least 35.

6. A food product according to claim 5 wherein the enzymatically hydrolyzed cereal has a DE value of from 50 to 55.

7. A process for preparing a fluid food product comprising preparing by weight percent a mixture of more than 50% of a food selected from a group consisting of fruits and vegetables, at least 10% cereal which comprises 2.5% to 3.5% oatmeal and, based upon dry matter, 20% to 25% enzymatically hydrolyzed cereal in liquid form having a dry matter content of from 35% to 40% by weight, oil in an amount for providing a fat content of from 2% to 4% and water.

8. A process according to claim 7 wherein the enzymatically hydrolyzed cereal has a DE value of at least 35.

9. A process according to claim 7 wherein the enzymatically hydrolyzed cereal has a DE value of from 50 to 55.

10. A process according to claim 7 wherein the cereal is in an amount of from 10% to 13% by weight based upon dry matter.

11. A process according to claim 7 further comprising, before incorporating the food with the cereal and oil and preparing the mixture, passing the food through a sieving machine and then incorporating and mixing the sieved food with the cereal and oil at an acidic pH for preparing the mixture.

12. A process according to claim 11 wherein the food is fruit and mixing is carried out at a pH of approximately 4.

13. A process according to claim 11 wherein the food is vegetable and the mixing is carried out at a pH of from 5 to 6.

14. A process according to claim 11 further comprising heating the mixture, degassing the heated mixture, reheating the degassed mixture, packing the mixture and then pasteurizing the packed mixture.

15. A process according to claim 14 wherein the mixture first is heated to about 90° C., the degassed mixture is reheated to about 98° C. and the reheated mixture is packed at a temperature of about 90° C.

16. The product of the process of claim 7 or 8.

* * * * *